(12) United States Patent
Ghiri et al.

(10) Patent No.: US 12,130,355 B2
(45) Date of Patent: Oct. 29, 2024

(54) SYSTEM AND METHOD FOR MICROWAVE IMAGING

(71) Applicant: Tiposi, Inc., Milpitas, CA (US)

(72) Inventors: Reza Ebrahimi Ghiri, Milpitas, CA (US); Jahan Ghofraniha, San Jose, CA (US); Shih H Mo, Milpitas, CA (US); Shen Chan, San Jose, CA (US); Chung-Hsing Chang, Milpitas, CA (US)

(73) Assignee: Tiposi, Milpitas, CA (US)

( * ) Notice: Subject to any disclaimer, the term of this patent is extended or adjusted under 35 U.S.C. 154(b) by 372 days.

(21) Appl. No.: 17/574,417

(22) Filed: Jan. 12, 2022

(65) Prior Publication Data
US 2022/0229171 A1    Jul. 21, 2022

Related U.S. Application Data

(60) Provisional application No. 63/138,370, filed on Jan. 15, 2021.

(51) Int. Cl.
*G01S 13/88* (2006.01)
*G01N 22/00* (2006.01)
*G01S 13/89* (2006.01)

(52) U.S. Cl.
CPC .............. *G01S 13/89* (2013.01); *G01N 22/00* (2013.01); *G01S 13/887* (2013.01)

(58) Field of Classification Search
CPC ..... G01N 22/00; G01S 13/106; G01S 13/887; G01S 13/89
See application file for complete search history.

(56) References Cited

U.S. PATENT DOCUMENTS

| | | | |
|---|---|---|---|
| 2020/0127672 A1* | 4/2020 | Regazzi | H04B 1/16 |
| 2022/0103264 A1* | 3/2022 | Babakhani | H04B 10/90 |
| 2022/0146312 A1* | 5/2022 | Schilt | G01J 3/453 |

* cited by examiner

*Primary Examiner* — Timothy A Brainard

(57) ABSTRACT

A microwave imaging system is provided. The microwave imaging system comprises at least one transmitter circuit and a plurality of receiver circuits. The microwave imaging system further comprises at least one direct digital synthesizer (DDS) circuit, for generating a signal that is provided as an input to each of the plurality of receiver circuits by the at least one transmitter. The microwave imaging system further comprises a clock generation module which is configured to provide a clock signal to each of the at least one transmitter circuit, the plurality of receiver circuits, and the DDS circuit.

12 Claims, 17 Drawing Sheets

SYSTEM AND METHOD FOR MICROWAVE IMAGING

TECHNOLOGICAL FIELD

This disclosure generally relates to microwave imaging, and more particularly relates to microwave imaging using a dual-comb transceiver.

BACKGROUND

Microwave imaging is a technique used for identifying and evaluating concealed or embedded objects in a structure by using electromagnetic (EM) waves in microwave range. The technique can produce two-dimensional and even three-dimensional microwave images of the objects. The microwave imaging technique is used in different applications such as spectroscopy and Magnetic Resonance Imaging (MM). Traditional microwave imaging systems use waveguide tube to obtain an image. In the traditional microwave imaging systems, transmitting, and receiving antennas are in the form of a waveguide. Therefore, the overall volume of the traditional microwave imaging system is large.

Further, the microwave imaging technique can be performed in frequency-domain and in time-domain. In the frequency domain, an excitation signal of a continuous sinewave with frequency swept across a bandwidth of interest is used. Similarly, in the time domain, an excitation signal of an instantaneous short-duration pulse that contains the bandwidth of interest is used. However, designing a high-resolution broadband frequency sweeping circuit in the frequency domain is difficult. As a result, the microwave imaging using time-domain measurements is recognized as a viable alternative to the microwave imaging using frequency-domain measurement. However, microwave imaging systems using time domain measurements (also referred to as "time-domain system") are bulky and expensive.

To lower the overall size of the time domain systems, some available methods use a specialized pulse generation circuit to construct a 3 to 10 GHz time-domain measuring system. However, the time-domain measuring system requires a high-sampling-rate oscilloscope for signal measurement. As a result, a discrete time-domain measurement system is used. However, it is still complicated in terms of jitter control. To that end, there is a need of a system that is self-sustainable (i.e., independent of any external laboratory), and an provide a high resolution in applications of imaging detection.

Generally, microwave imaging technology is applicable for disease diagnosis, early cancer detection, food safety and quality control, material characterization, and the like. Further, in many applications of the microwave imaging techniques such as MM, a high signal-to-noise ratio (SNR) is required. In particular, to provide high SNR, maintaining the synchronization and accuracy of repetition rate of signals is challenging. To that end there is a need, of a system that provides high SNR with accurate repetition rate of the signals.

BRIEF SUMMARY

It is an objective of some of the example embodiments disclosed herein to provide efficient solutions to the problems and challenges discussed above. More specifically, it is an objective of the various embodiments disclosed herein to provide a system having low sampling rate ADC, high SNR, high resolution and which is independent of any external laboratory.

According to some embodiments, a system for microwave imaging is provided. The system comprises a dual-comb transceiver module, comprising: at least one transmitter circuit; and a plurality of receiver circuits. The microwave imaging system further comprises a direct digital synthesizer (DDS) circuit configured to generate at least one comb signal, wherein the at least one comb signal is provided to the at least one transmitter circuit, and wherein the at least one transmitter circuit is configured to provide the at least one comb signal to the plurality of receiver circuits.

According to an embodiment, the present disclosure provides a method for microwave imaging is provided. The method comprises: transmitting an output signal from a transmitter to at least one receiver module via a channel; transmitting a portion of the output signal from the transmitter to a reference receiver module via an attenuator module; generating a first output signal by the at least one receiver module and a second output signal by the reference receiver module; and determining one or channel parameters associated with the microwave imaging based on the first output signal and the second output signal.

According to yet another embodiment, a dual-comb transceiver is provided. The dual-comb transceiver comprises a transmitter module configured to transmit an output signal; at least one receiver module configured to receive the output signal from the transmitter via a channel; and generate a first output signal; and a reference receiver module configured to receive a portion of the output signal transmitted by the transmitter module via an attenuator module; and generate a second output signal, wherein one or more channel parameters associated with the channel are determined based on the first output signal and the second output signal.

BRIEF DESCRIPTION OF DRAWINGS

Figure 1A:
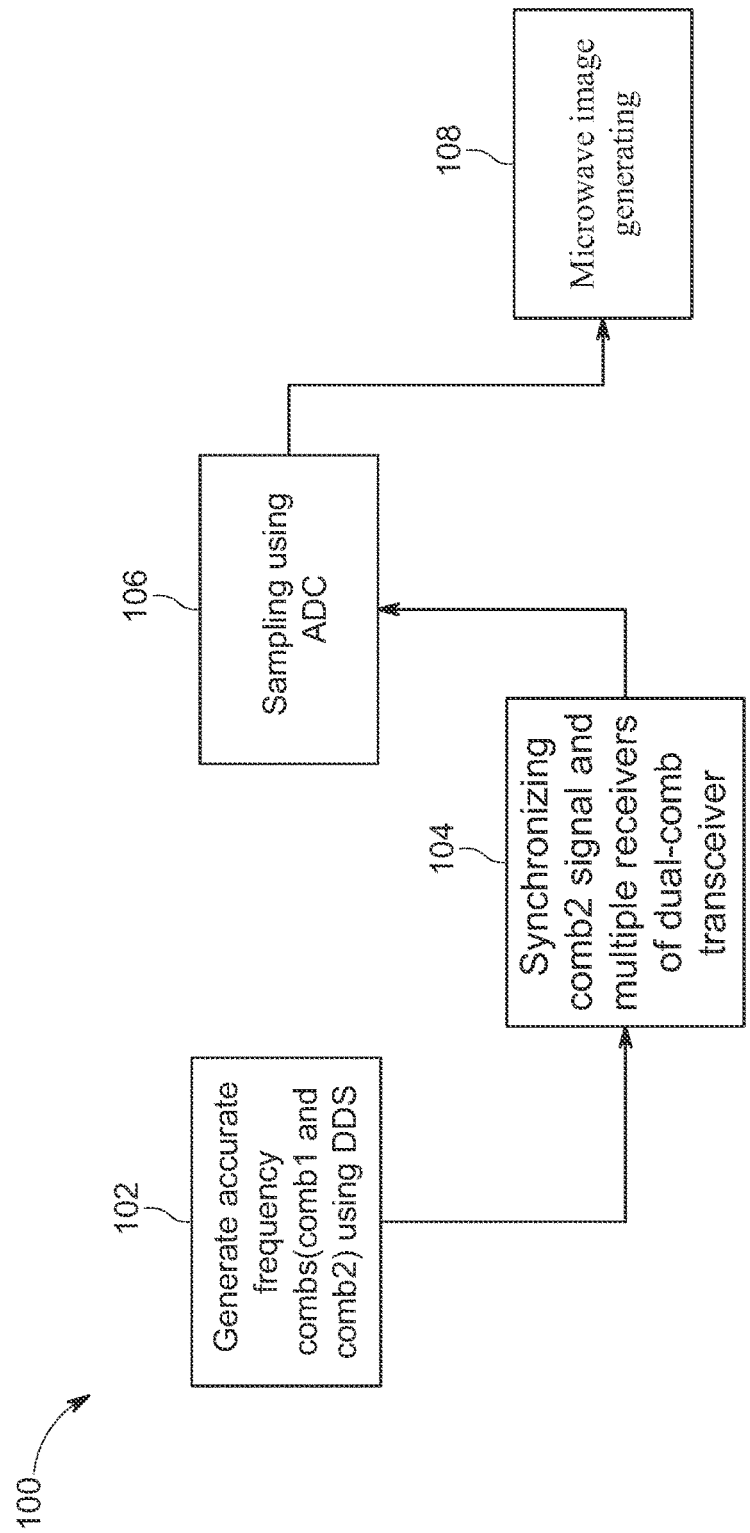
Figure 1B:
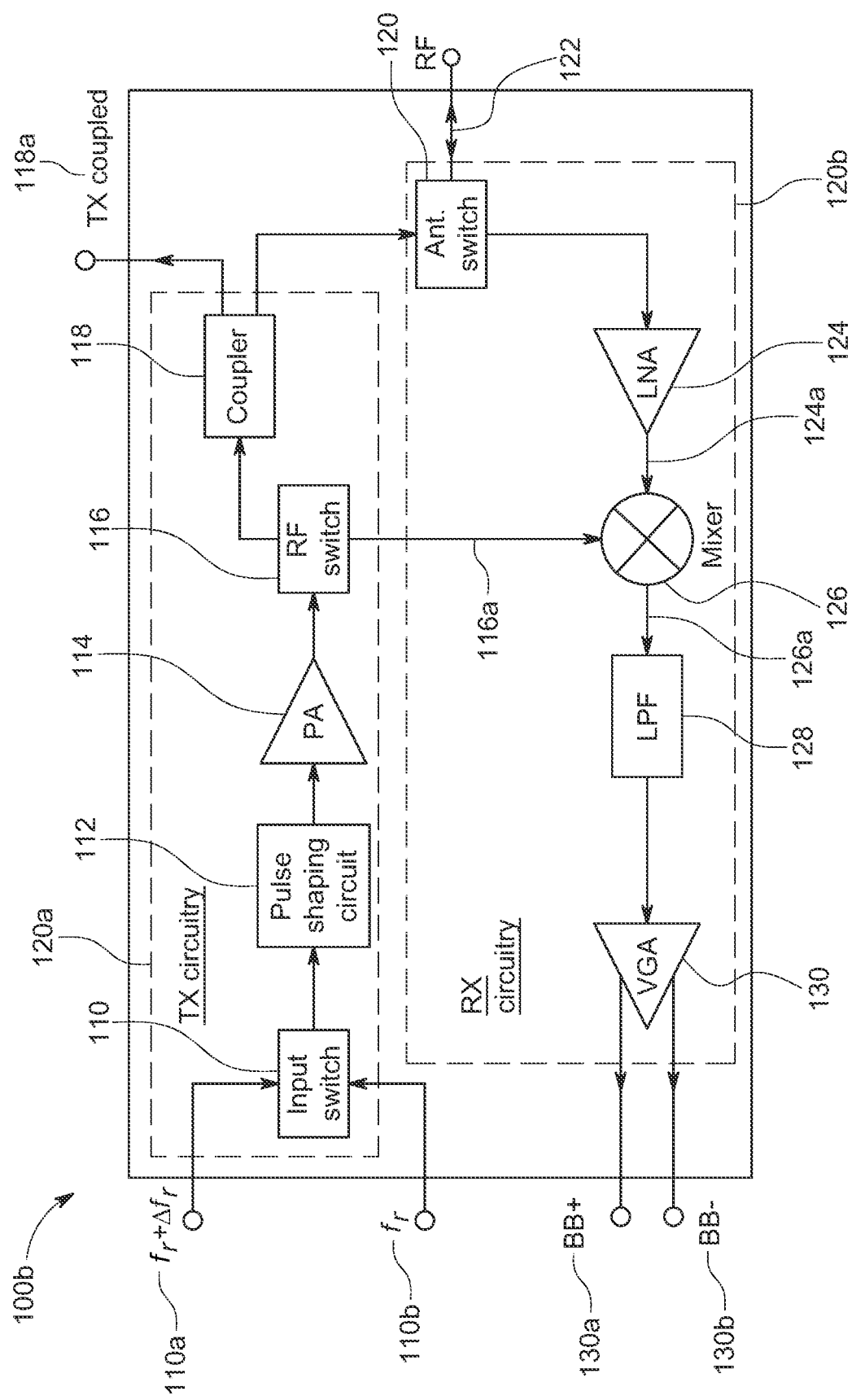
Figure 1C:
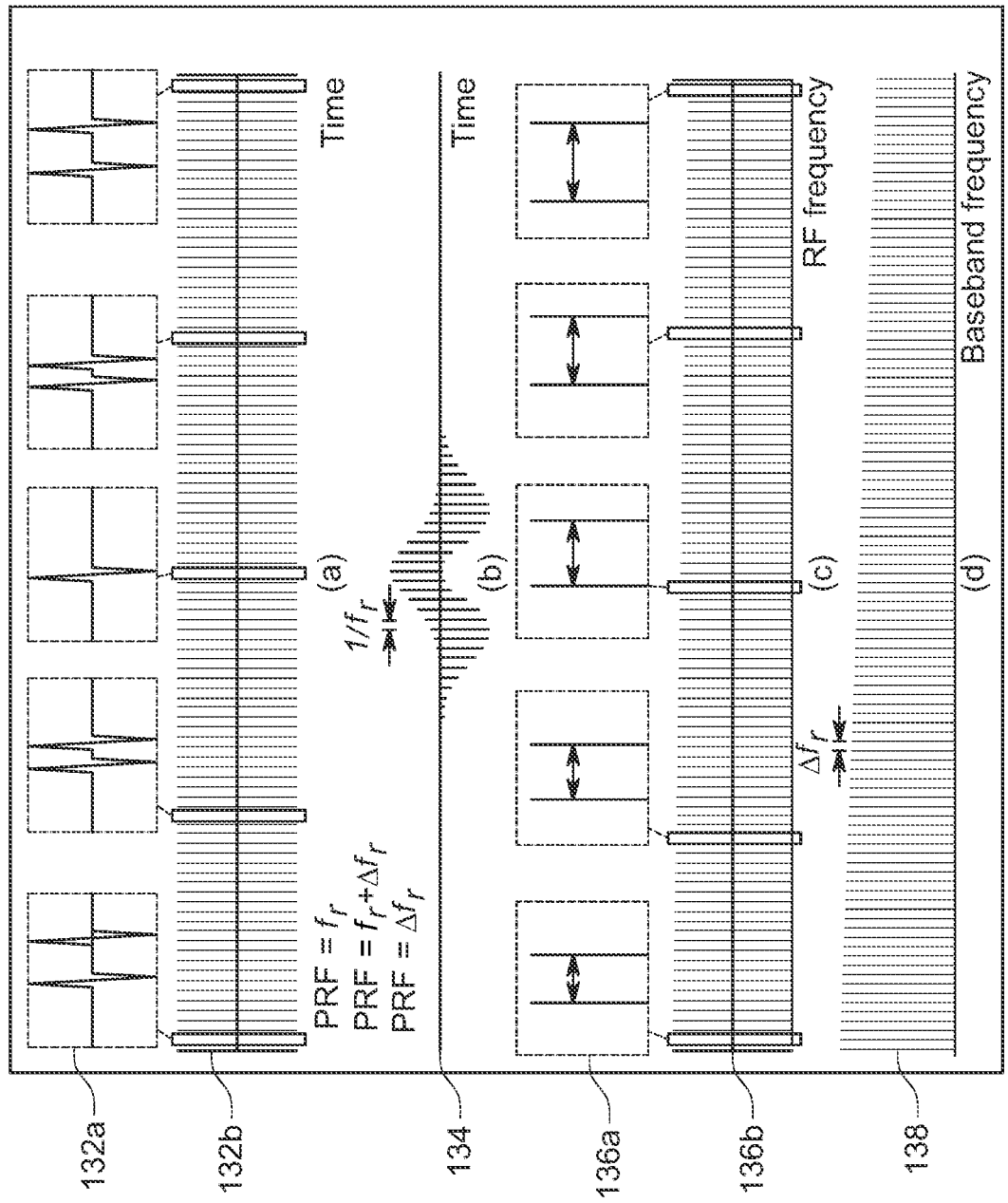
Figure 2:
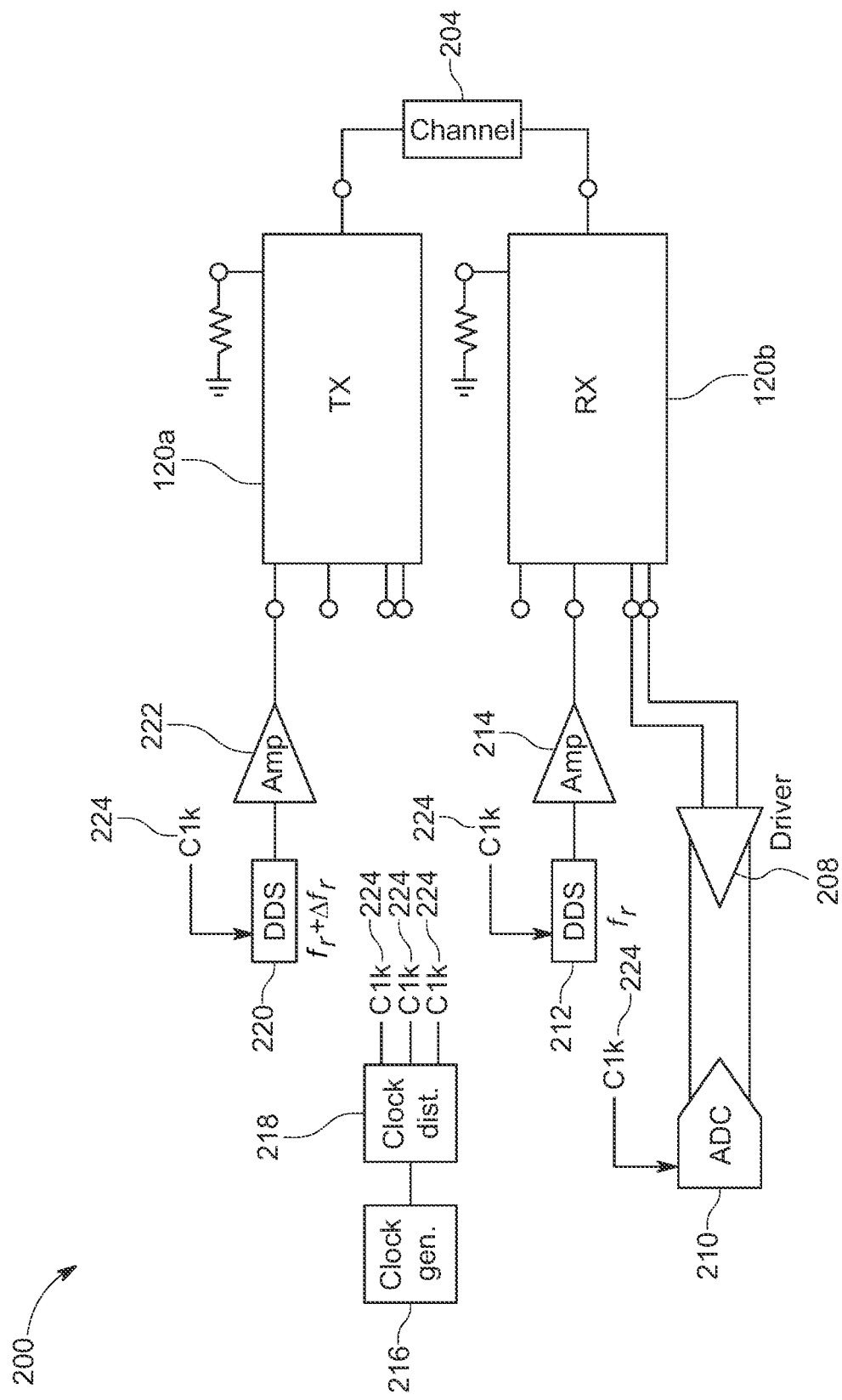
Figure 3A:
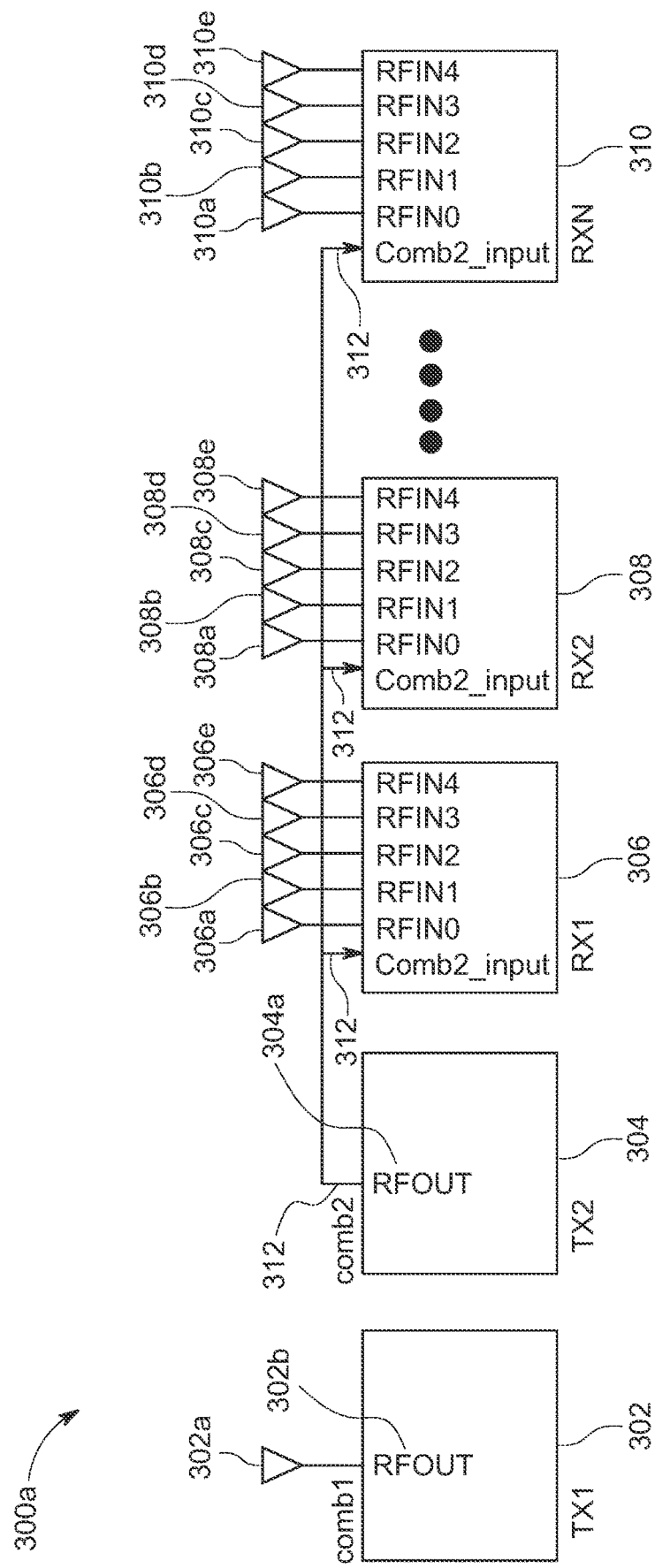
Figure 3B:
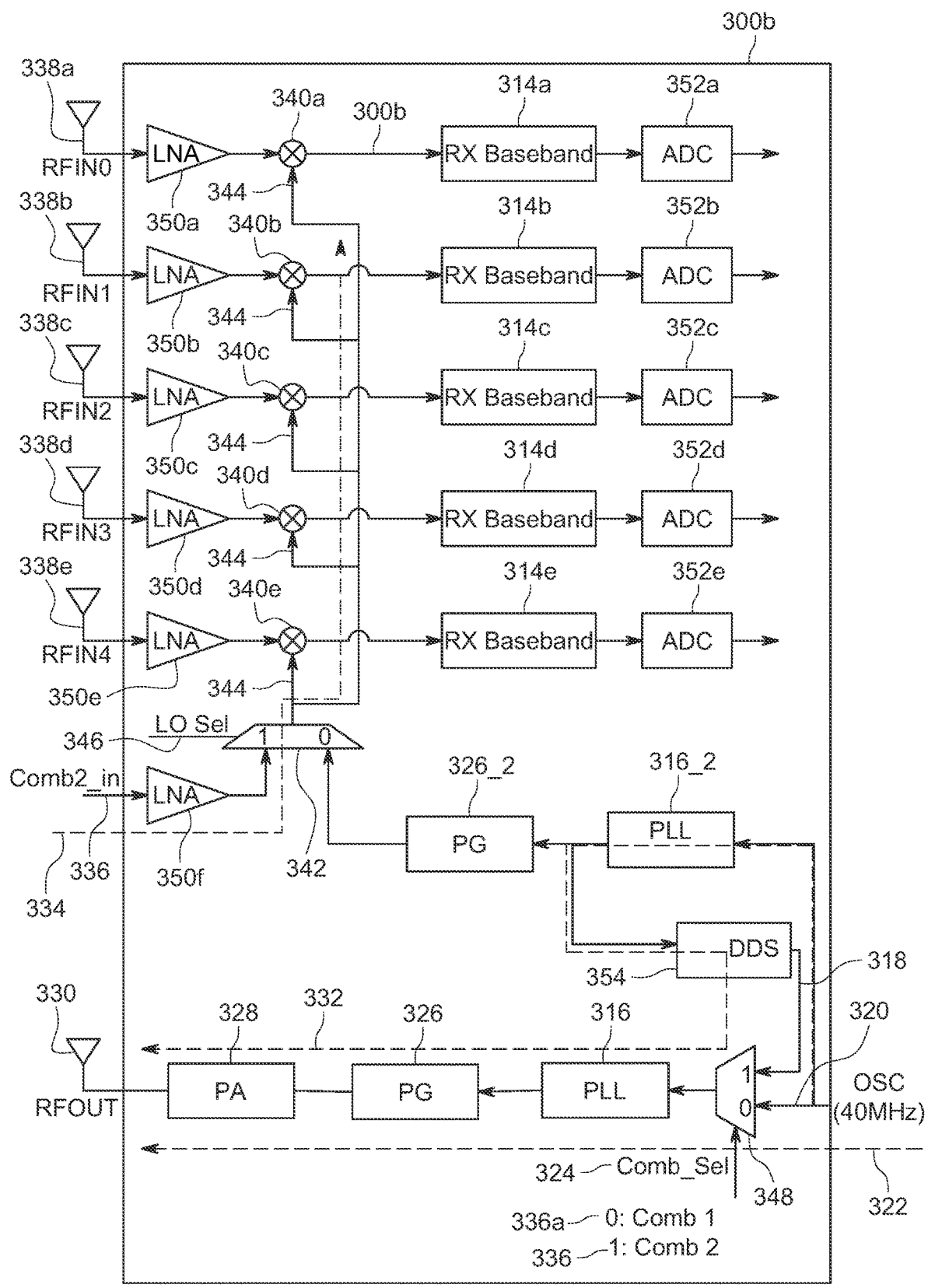
Figure 4A:
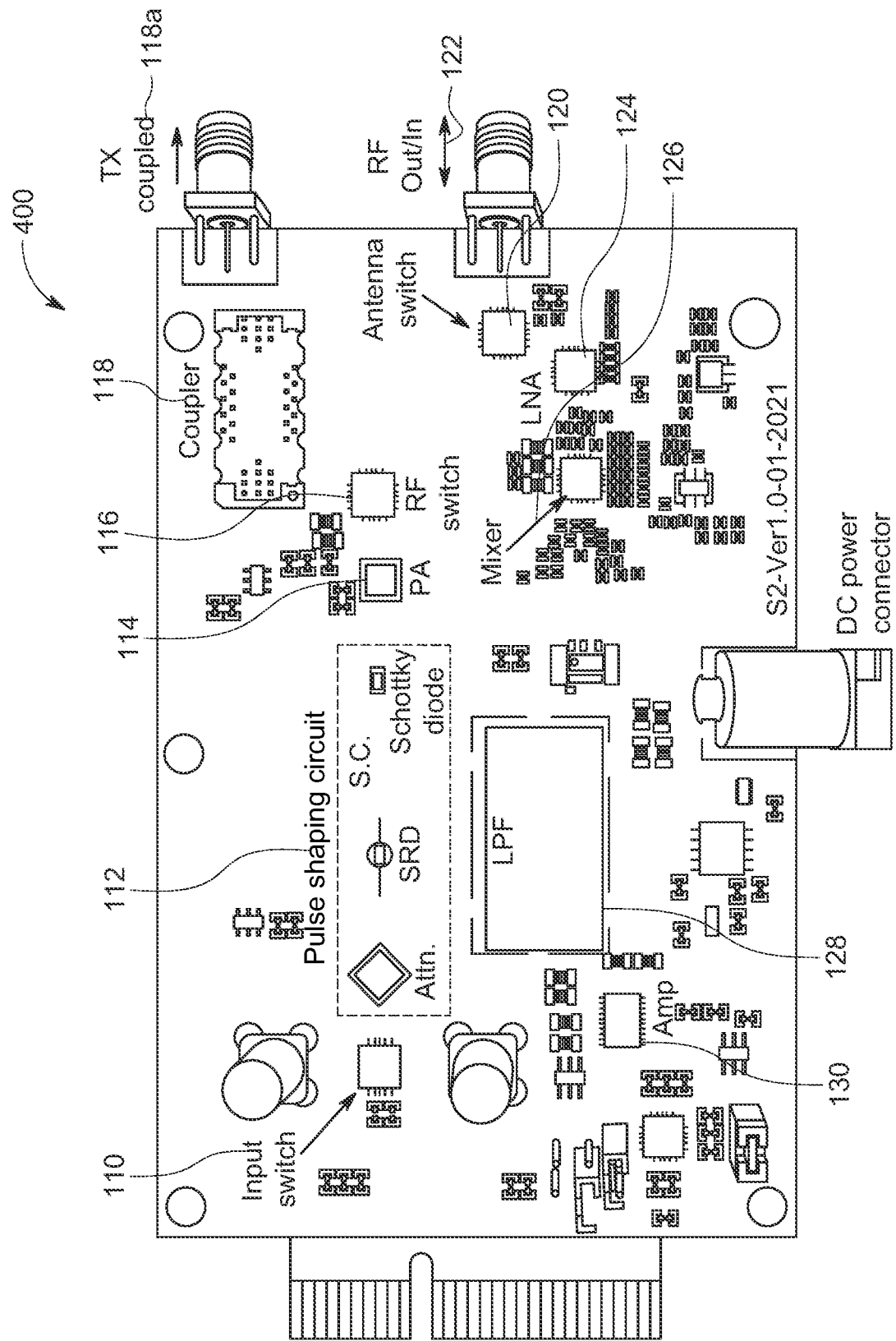
Figure 4B:
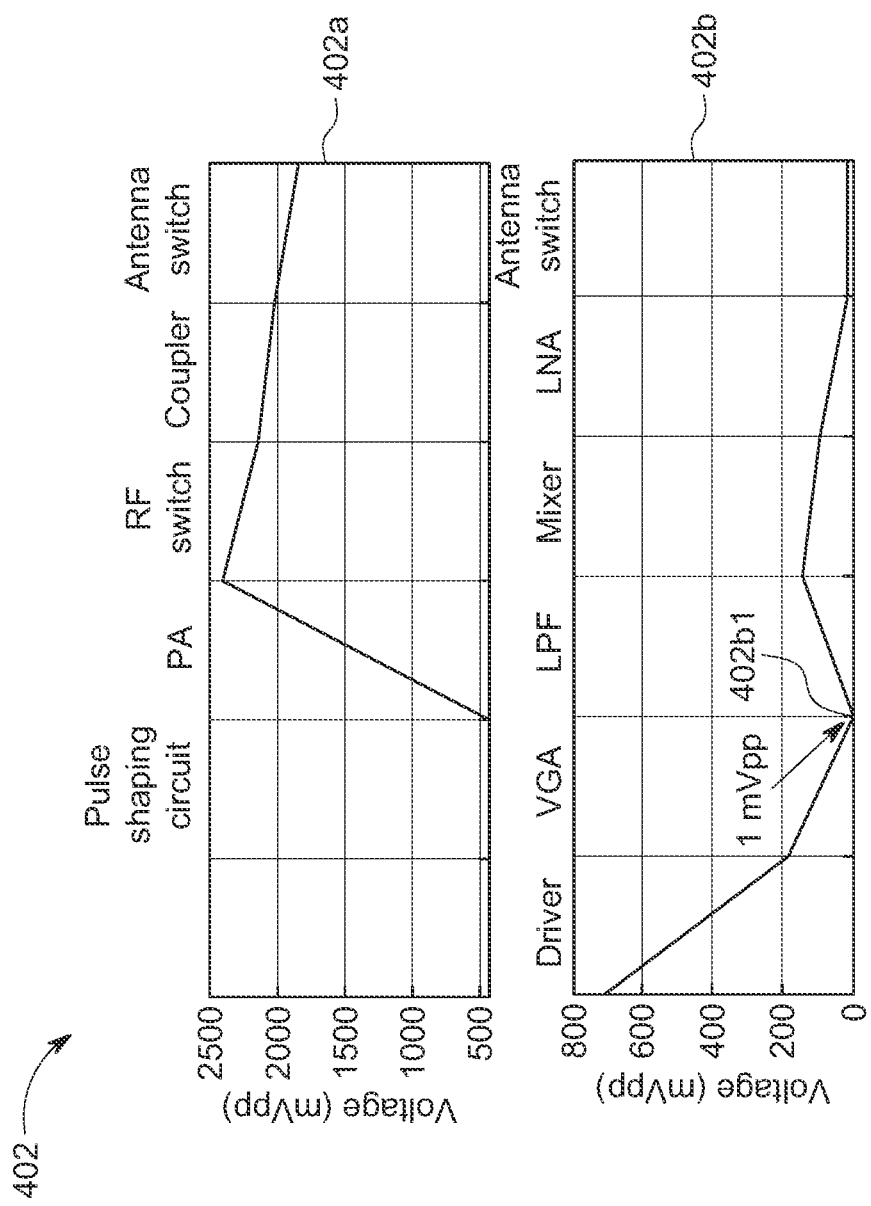
Figure 5A:
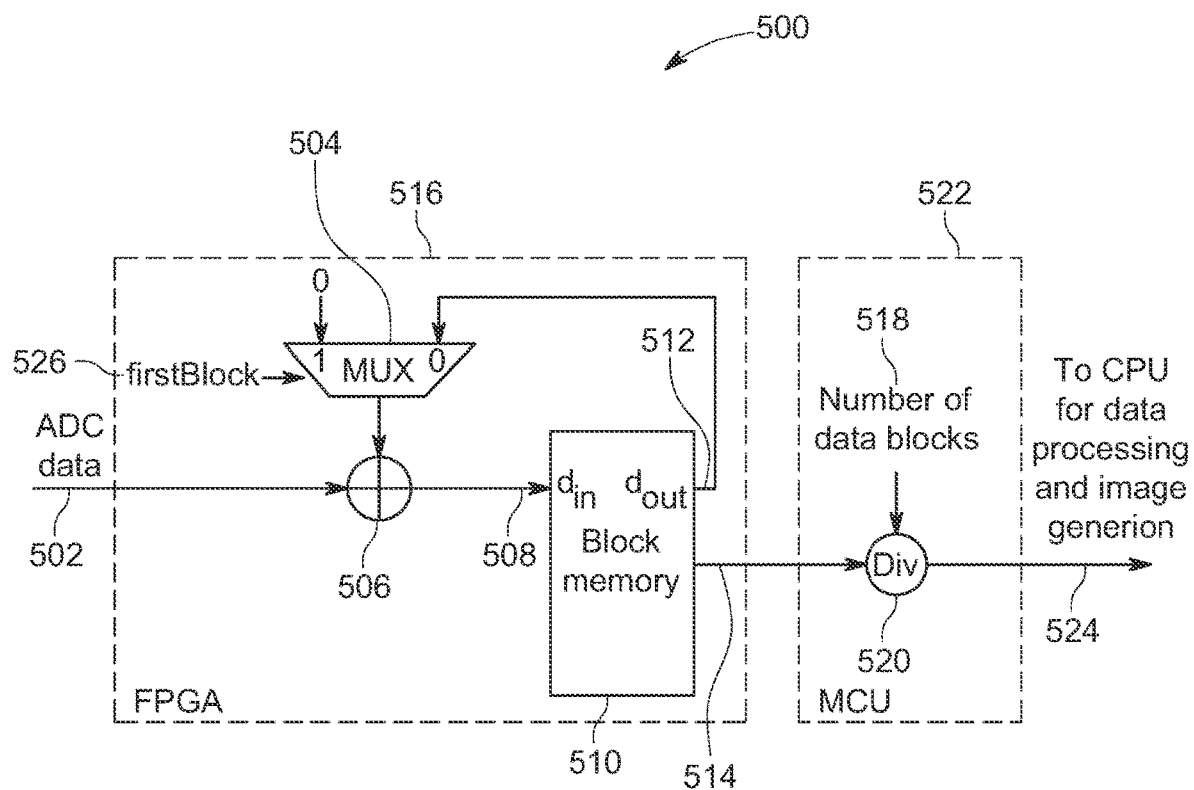
Figure 5B:
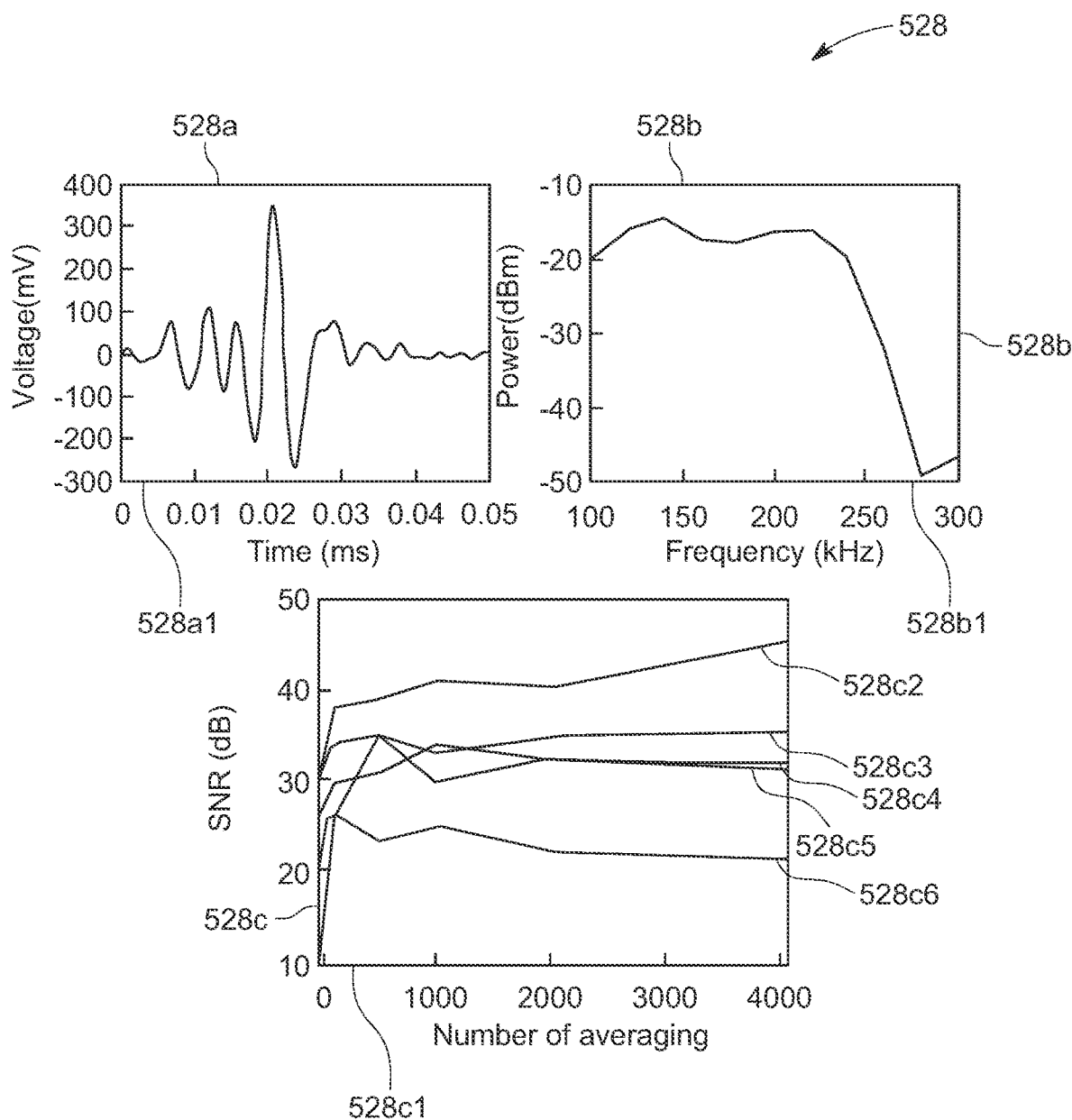
Figure 6:
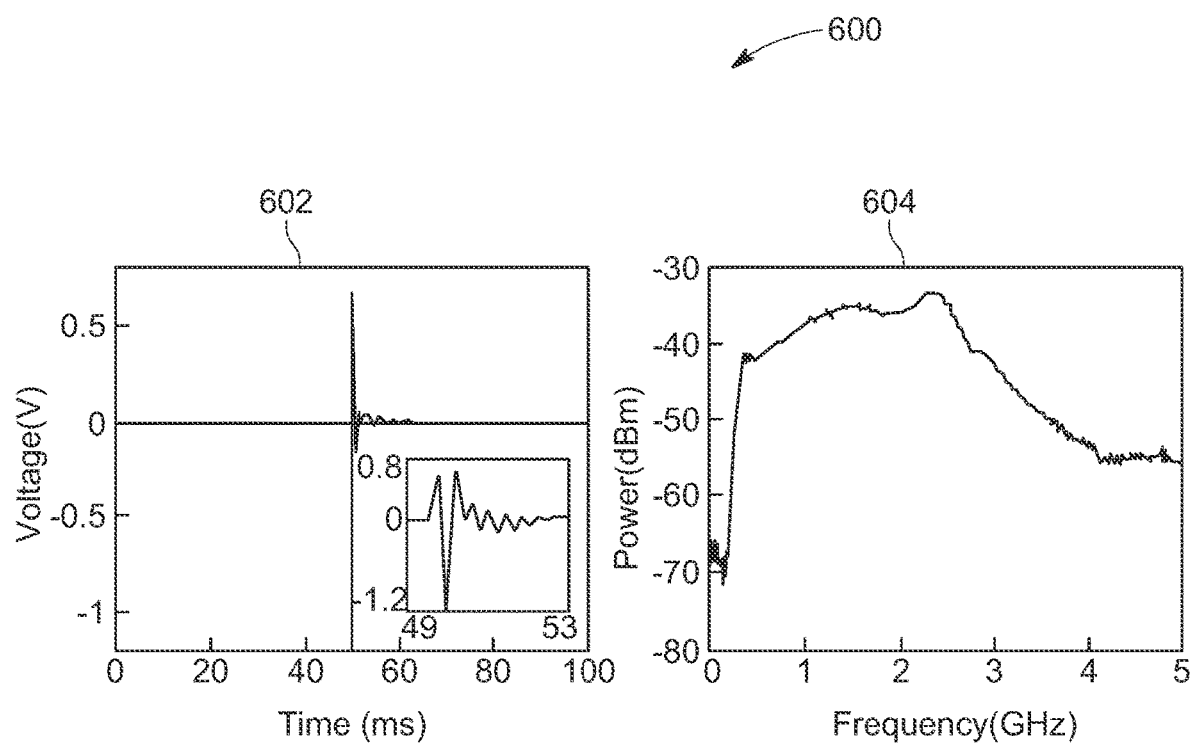
Figure 7A:
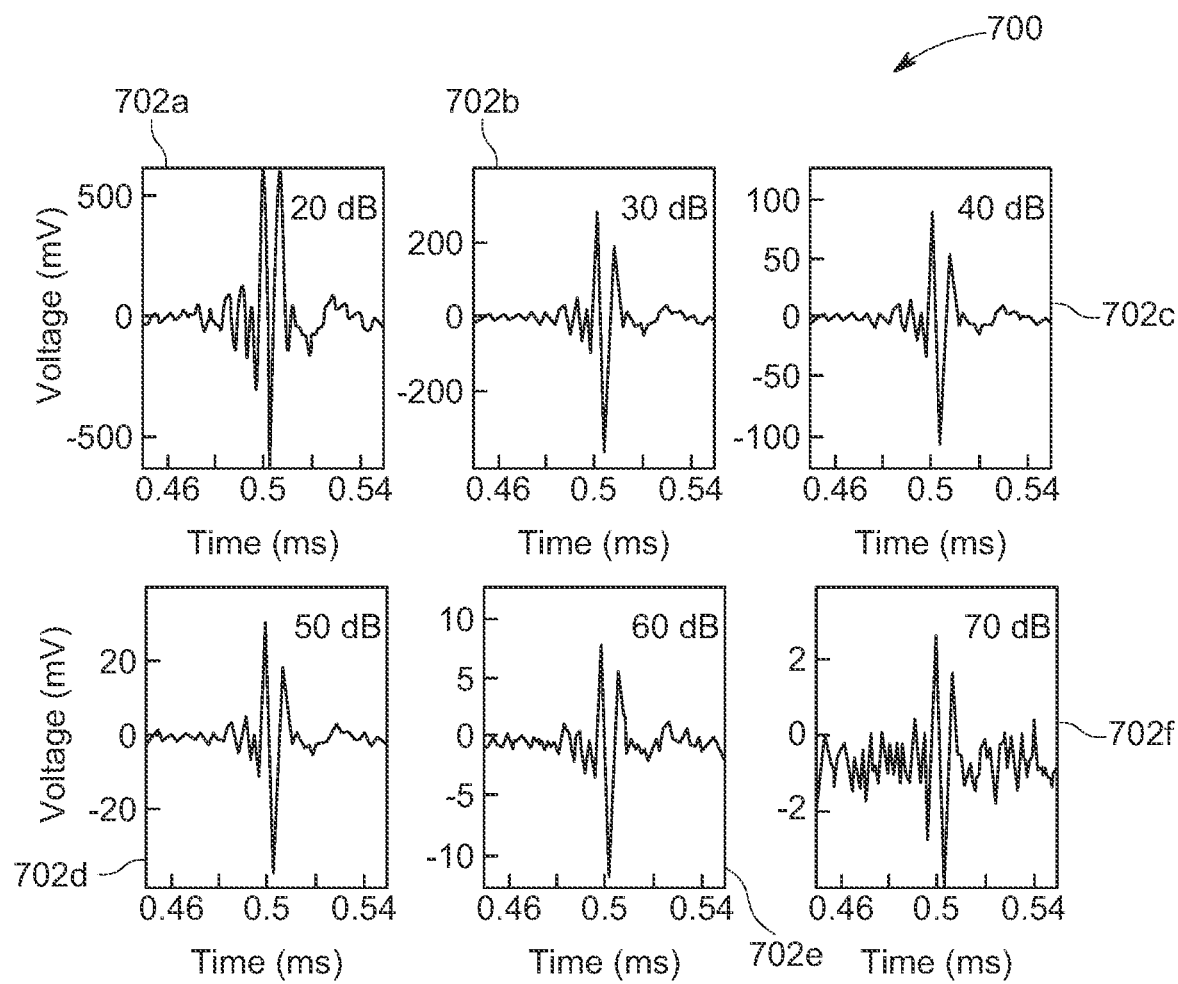
Figure 7B:
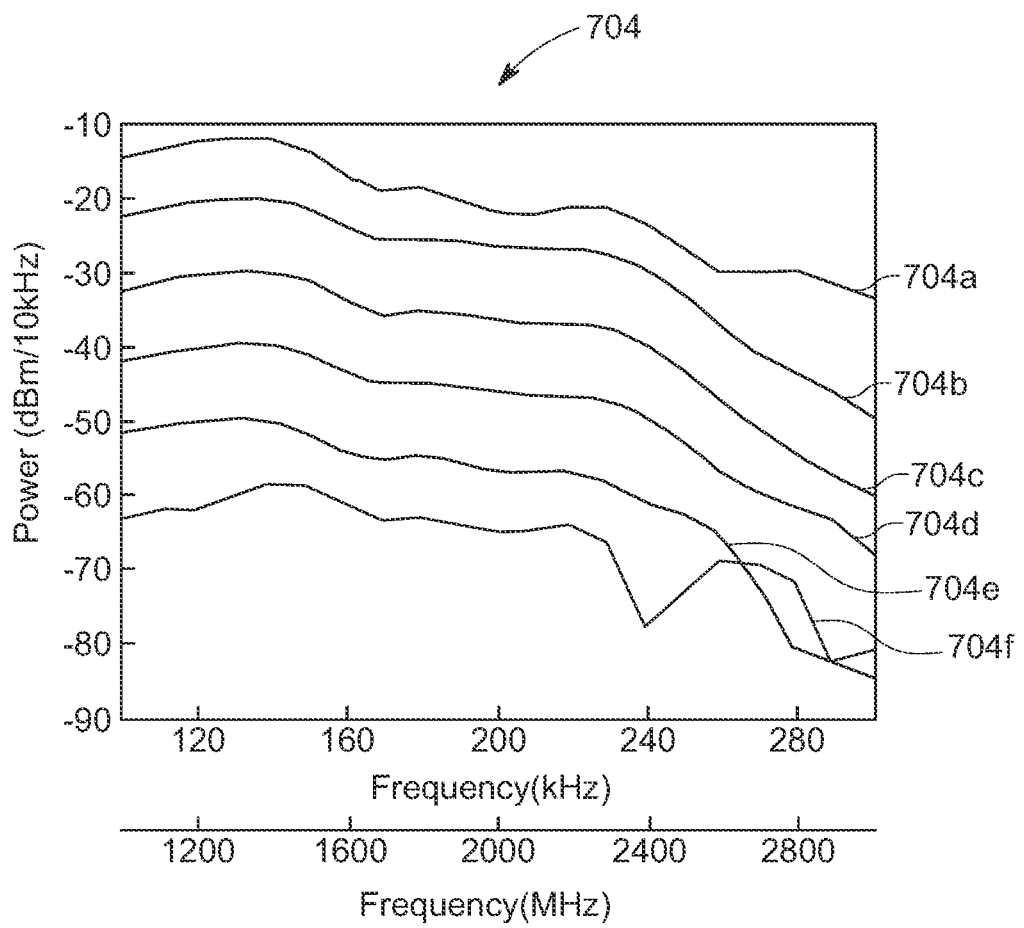
Figure 8:
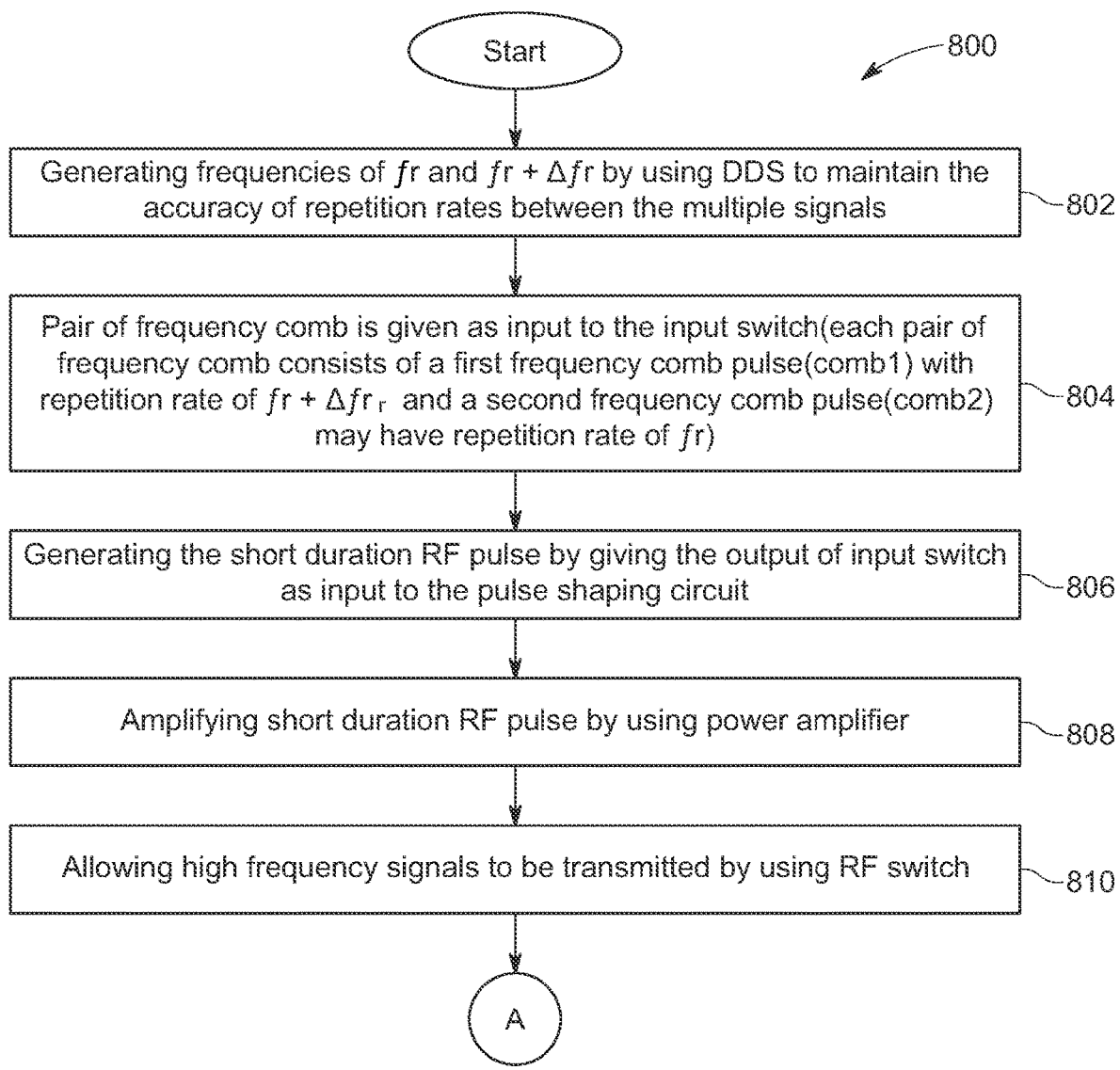
Figure 8:
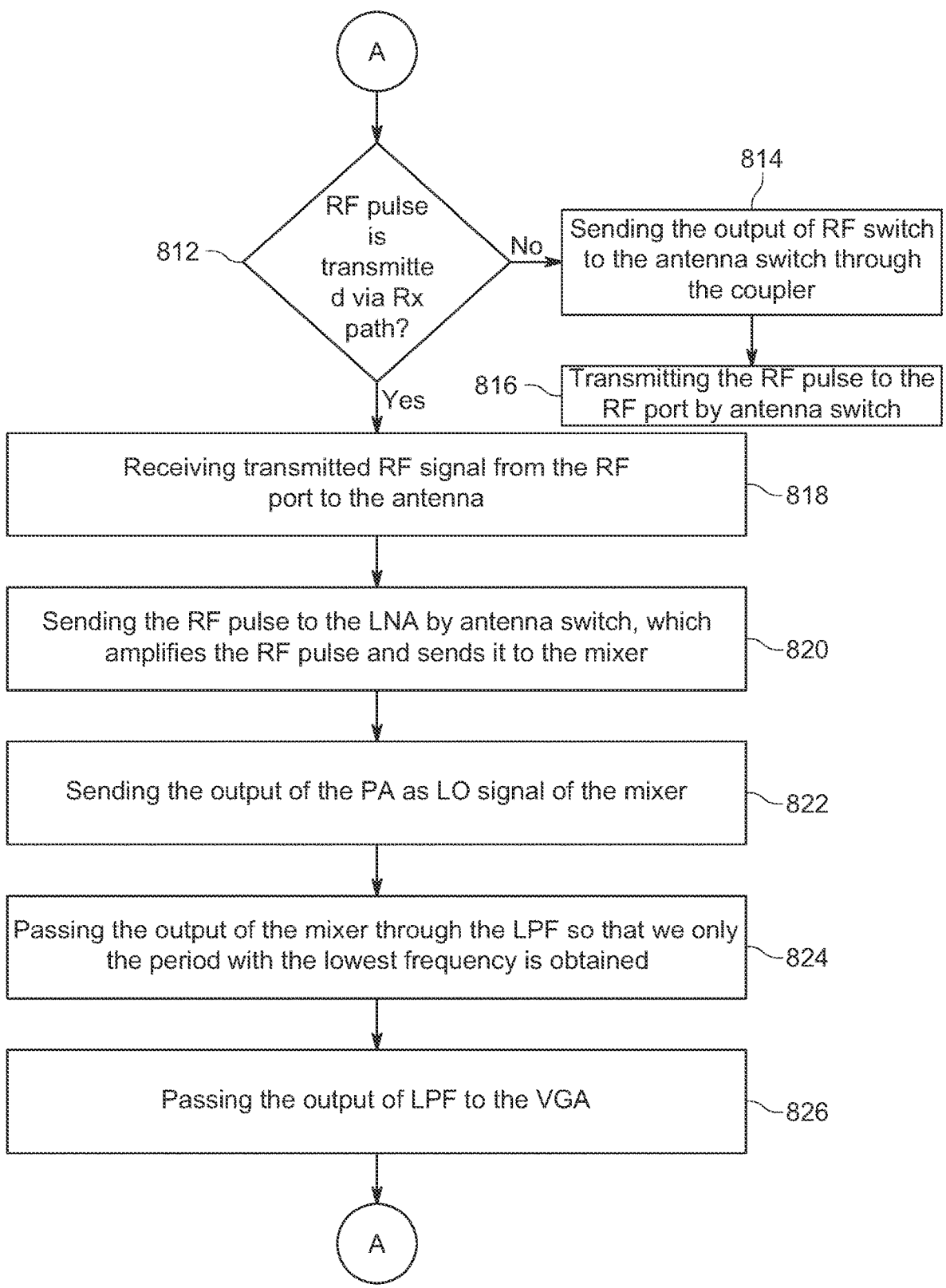
Figure 8:
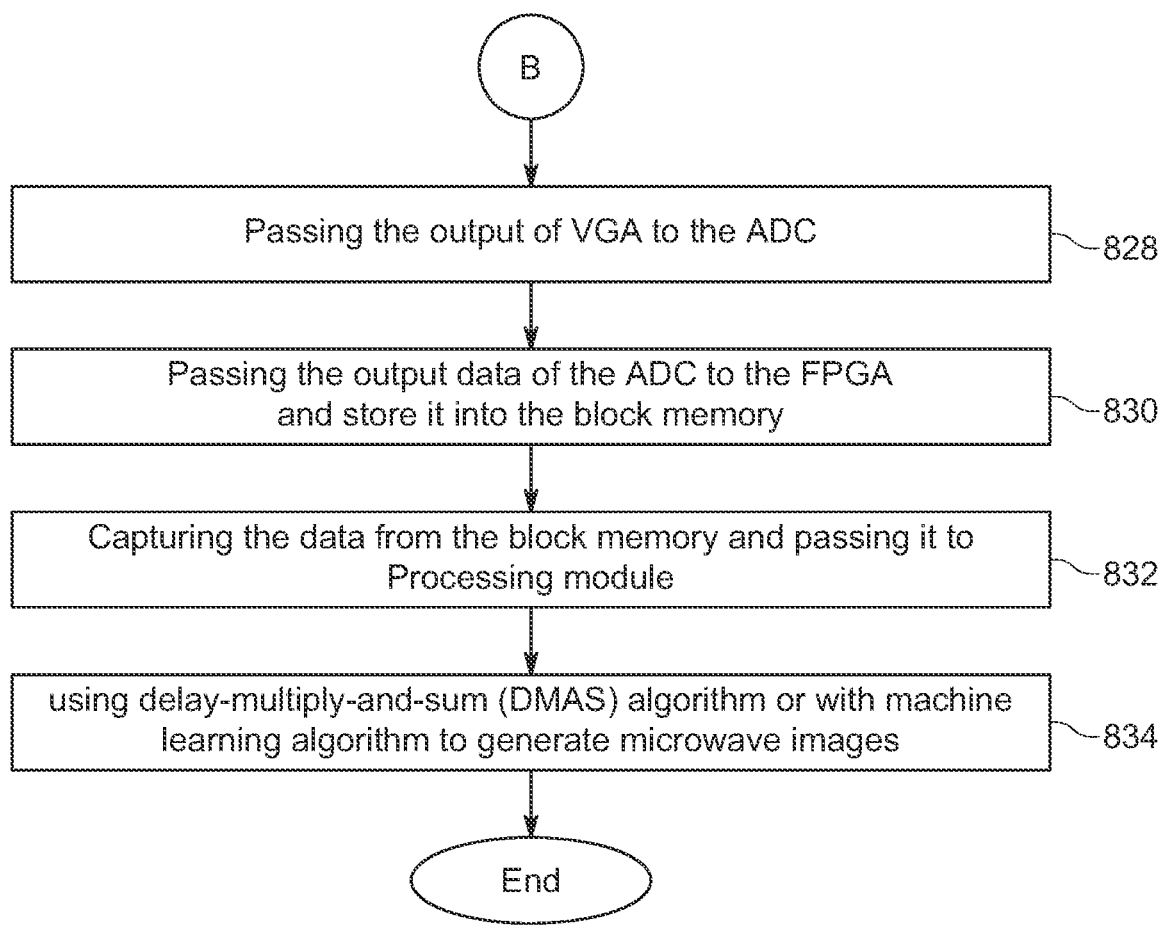
Figure 9:
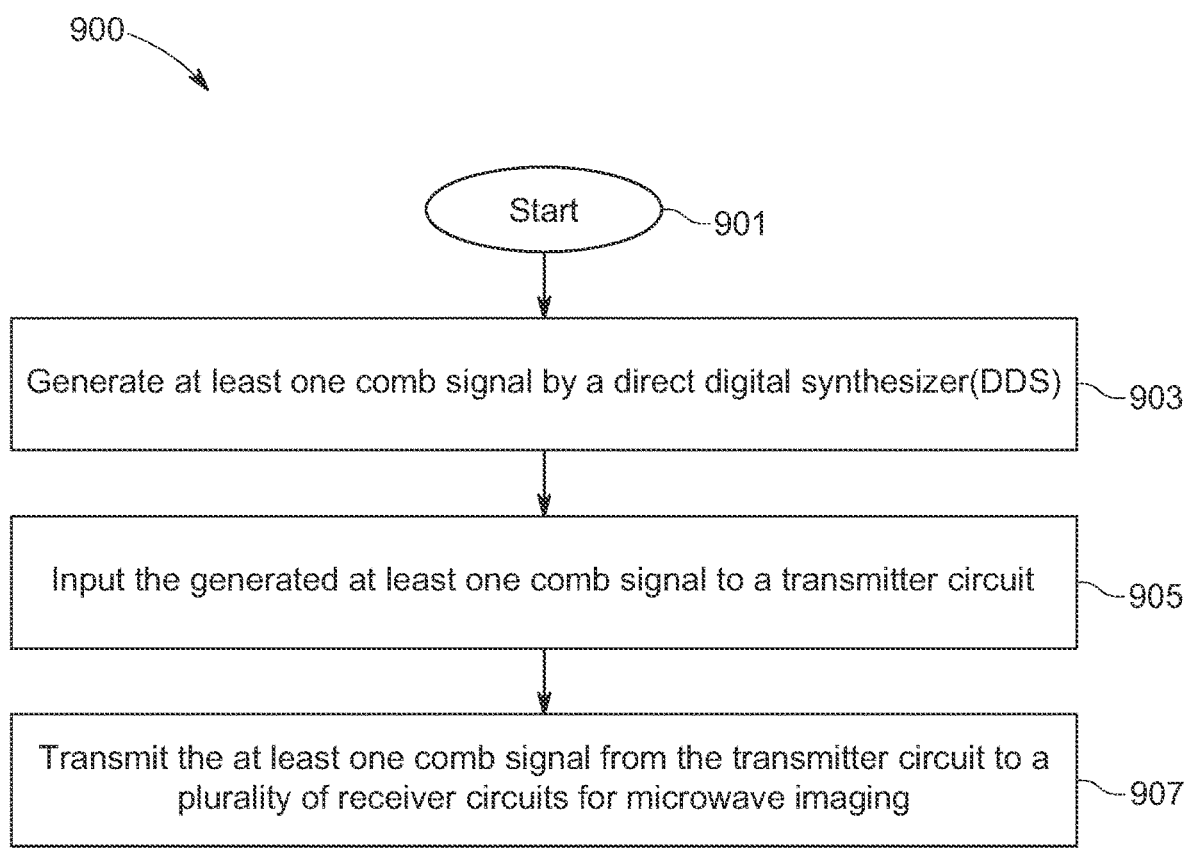

Having thus described example embodiments of the present disclosure in general terms, reference will now be made to the accompanying drawings, which are not necessarily drawn to scale, and wherein:

FIG. 1A illustrates a block diagram of a high-level workflow of microwave image generation using a dual-comb transceiver, according to an embodiment of the present disclosure;

FIG. 1B illustrates a block diagram of a dual-comb transceiver used in an imaging device, according to an embodiment of the present disclosure;

FIG. 1C illustrates graphical representation of waveforms of operations of the dual-comb transceiver, according to an embodiment of the present disclosure;

FIG. 2 illustrates a block diagram of a transmitter circuitry and receiver circuitry of the dual-comb transceiver, according to an embodiment of the present disclosure;

FIG. 3A illustrates a block diagram of a global distribution architecture of a dual comb transceiver used in a microwave imaging system, according to an embodiment of the present disclosure;

FIG. 3B illustrates another block diagram of the global distribution architecture of dual-comb transceiver shown in FIG. 3A, according to an embodiment of the present disclosure;

FIG. 4A illustrates a fabricated dual-comb transceiver, according to an embodiment of the present disclosure;

FIG. 4B illustrates a graph showing different waveforms depicting level diagram of transmitter (TX) and receiver (RX) of the dual-comb transceiver shown earlier, according to an embodiment of the present disclosure;

FIG. 5A illustrates a block diagram of the real time image generation implementation in field programmable gate array (FPGA), according to an embodiment of the present disclosure;

FIG. 5B illustrates graphical diagrams showing an impact of averaging on quality of signal and SNR for diverse types of averaging, according to an embodiment of the present disclosure;

FIG. 6 illustrates a graph of measured output pulse of transmitter (TX), according to an embodiment of the present disclosure;

FIG. 7A illustrates graphs comprising responses of the dual-comb transceiver to different attenuations in time domain, according to an embodiment of the present disclosure;

FIG. 7B illustrates a graph comprising responses of the dual-comb transceiver to different attenuations in frequency domain, according to an embodiment of the present disclosure;

FIG. 8 illustrates a flow diagram of microwave imaging using the dual-comb transceiver, according to an embodiment of the present disclosure; and FIG. 9 illustrates another flow diagram of microwave imaging using the dual-comb transceiver, according to an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus (or a system) to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

FIG. 1A illustrates a block diagram of a high-level workflow 100 of microwave image generation using a dual-comb transceiver, according to an embodiment of present disclosure.

A frequency comb is a signal whose spectrum consists of a series of discrete, equally spaced frequency lines. Frequency combs may be generated by using a circuit such as a direct digital synthesizer (DDS). The DDS is a frequency synthesizer technique for generating arbitrary waveforms from a single fixed-frequency reference clock. By using a reference clock frequency, DDS, at step 102, is configured to generate the signal with accurate repetition rate. In the present disclosure, DDS is used for generating 102 comb1 signal with the repetition rate of $f_r+\Delta f_r$ and comb2 signal with the repetition rate of $f_r$.

The dual-comb transceiver of the present disclosure associated with the DDS. In the dual-comb transceiver, each of the frequency combs has a different repetition rate. For example, the repetition rate of comb1 is $f_r+\Delta f_r$ and the repetition rate of comb2 is ($f_r$). Therefore, the workflow 100 comprises, at 102, using the DDS to generate accurate frequency combs (a comb1 and a comb2).

Further, at step 104, a synchronization operation is performed by the dual-comb transceiver to generate synchronized RF periodic pulses with comb2 signal. The dual-comb-transceiver uses comb1 and comb2 signal as input and synchronizes the comb1 and comb2 signal. For the synchronization, the dual-comb-transceiver uses one transmitter (TX) chip to generate globally distributed comb2 signal and multiple receiver (RX) chips. The comb1 signal is provided to the TX chip and comb2 signal is given as input to the multiple RX chips. Therefore, all the RX chips and comb2 signal are synchronized together producing an analog signal comprising synchronized comb1 signal and comb2 signal.

Then, at step 106, an analog to digital convertor (ADC) is used to perform the sampling of the output pulses of the dual-comb transceiver. For microwave image generation, the analog signal at the output of the dual-comb transceiver is required to be sampled and converted to digital signal. To that end, the ADC 106 is required for the sampling of the output signal of the dual-comb transceiver. Then, at step 108, these samples are provided as input to an FPGA. The output of FPGA is associated with a processing module, including either or a combination of an MCU and a CPU. Further, by using delay, multiply and sum (DMAS) or machine learning (ML) algorithm, microwave images are generated.

FIG. 1B illustrates a block diagram of a dual-comb transceiver 100b, according to an embodiment of the present disclosure. The dual-comb transceiver 100b receives a pair of frequency combs (comb1, $f_r+\Delta f_r$ 110b and comb2, $f_r$ 110a) is used. As used herein, the frequency comb is a source whose spectrum consists of a series of discrete, equally spaced frequency lines. The dual-comb transceiver 100b operates in half-duplex mode. (i.e., at one time it will operate either as a transmitter or as a receiver). The dual comb transceiver 100b may include a transmitter circuitry 120a and a receiver circuitry 120b. The transmitter circuitry 120a may include an input switch 110, a pulse shaping circuit 112, a power amplifier (PA) 114, an RF switch 116 and a coupler 118. The receiver circuitry 120b may include an antenna switch 120, a low noise amplifier (LNA) 124, a mixer 126, a low pass filter (LPF) 128 and a variable gain amplifier (VGA) 130.

The dual comb transceiver 100b may operate with a plurality of pairs of frequency combs. In the dual comb transceiver 100b, each pair of frequency combs of the plurality of the pairs of frequency combs has a different repetition rate and each pair of frequency combs of the plurality of the pairs of frequency combs consists of the first comb pulse (comb1) with a repetition rate of $f_r+\Delta f_r$ 110b and the second comb pulse (comb2) with repetition rate of ($f_r$) 110a. Each pair of frequency combs of the plurality of the pairs of frequency combs is given as input to the input switch 110 of the dual-comb transceiver 100b. Further, the input switch 110 selects between the pair of frequencies $f_r$ 110a and ($f_r+\Delta f_r$) 110a. The output of the input switch 110 is connected to a pulse shaping circuit 112. The pulse shaping circuit 112 includes an attenuator, a step recovery diode (SRD), a short-circuited stub, and a Schottky diode. The pulse shaping circuit 112 converts input sine wave into a short duration pulse to generate a pulse of specific input frequency.

In the pulse shaping circuit 112, when the SRD is forward biased, it stores an electric charge and then releases it in a brief period of time when it is reverse biased. The SRD quickly shuts off after releasing the charge. An output signal of the SRD has an instant transition that is used to generate the short-duration pulse. An inverted and delayed version of the SRD output signal is formed by the short-circuited stub connected next to the SRD. The short duration pulse is produced by the SRD output signal and the inverted and delayed signal reflected off the short-circuited stub. A length of the short-circuited stub determines a width of the short duration pulse. Further, the Schottky diode is used to decrease ringing in the synthesized pulse and the attenuator is used to improve input matching.

The output of pulse shaping circuit 112 is given as an input to a power amplifier (PA) 114, where the PA 114 is configured to take weak electrical signal as input and, with the help of an external power source, reproduce a stronger waveform at the output. Thus, the PA 114 amplifies the input signal. The output of the PA 114 is given as input to the radio frequency (RF) 116 switch. The RF switch 116, also referred to as a microwave switch, allows high-frequency signals to be transferred between various transmission channels or devices. The RF switch 116 forwards the amplified signal to a TX path or to a local oscillator port 116a of the mixer 126 in a RX path. The TX path is formed by the coupler 118, the antenna switch 120, the RF port 122 and an output port 118a. The RX path is formed by the mixer 126, the LPF 128, and the VGA 130. The mixer 126, also referred to as the frequency mixer, is a nonlinear electrical circuit that generates new frequencies by combining two signals (e.g., the amplified periodic pulse and the received periodic pulse). The mixer 126 receives two inputs, and outputs new signals based on the sum and difference of original frequencies of the input signals. There are three ports of the mixer 126. First port is the input port 124a, where the input signal that needs to be adjusted in frequency is received. The input signal is usually the incoming signal or equivalent and is usually at a low level in comparison to the other input obtained from a second port. At the second port, input signal is associated with the local oscillator (LO) port 116a. The third port is the output port 126a of the mixer 126. The output of the mixer 126 is referred to as intermediate frequency (IF).

When the RF switch 116 forwards the amplified signal through the TX path, the amplified signal would be passed via the coupler 118, the antenna switch 120 to the RF port 122. When the RF switch 116 forwards the PA 114 output pulse to the RX path, the PA 114 pulse is used as the LO signal 116a of the mixer 126 for multiplication with the received pulse from the RF port 122. The antenna switch 120 passes the received pulse to the LNA 124. The LNA 124 is an electronic amplifier that amplifies a low-power signal without lowering the signal-to-noise ratio appreciably. The LNA 124 boosts the power of both the signal and the noise at its input, but it also introduces some noise. The LNA 124 is configured to reduce the amount of extra noise. The frequency domain output of the mixer 126 is periodic, with a repetition rate of $f_r$. Further, the LPF 128 preserves the lowest period of output signal of the mixer 126 while filtering out the remainder. The LPF 128 decreases the pulse amplitude in the time domain while allowing the system output pulse to be captured using a low sampling rate ADC. The periodic pulse is amplified using the low frequency variable gain amplifier (VGA) 130 after the LPF 128. The VGA 130 is an electronic device (amplifier) that changes its gain in response to a control voltage (CV) applied to it. The VGA 130 is also used in synthesizers, amplitude modulation, and audio level reduction, among other uses. For the purpose of determining the proper gain and signal, the VGA 130 is utilized. Based on the amplification, the VGA 130 generates the output signals having amplitude value of BB+ 130a and BB− 130b.

FIG. 1C illustrates graphical representation of different waveforms associated with operation of the dual comb transceiver 100b using short duration RF periodic pulses, according to an embodiment of the present disclosure. A first RF periodic pulse having repetition frequency (PRF) of $f_r$ is multiplied by a second RF periodic pulse with a slightly different PRF of $f_r+\Delta f_r$ to produce a third periodic pulse with the PRF of $\Delta f_r$ in the dual-comb transceiver 100b. If one of the RF periodic pulses travels through an RF channel before being multiplied, the outcome is the third comb signal, which has the entire RF channel response (phase and magnitude) mapped in the base band frequency at the same time. In FIG. 1C, there is shown a plurality of waveforms (e.g., a waveform 132a, a waveform 132b, a waveform 134, a waveform 136a, a waveform 136b, and a waveform 138) The RF periodic pulse is represented in time domain in waveform 132a and in frequency domain in waveform 132b. The multiplication result of the first RF periodic pulse and the second RF periodic pulses is shown in waveform 134. The multiplication waveform 134 results in small value of amplitude when the first RF periodic pulse and the second RF periodic pulses have a small overlap, but as the overlap between them rises, their multiplication results in a larger amplitude, and when the first RF periodic pulse and the second RF periodic pulse are aligned, the resultant pulse amplitude reaches its highest value. The analogous spectra of multiplication results of the first RF periodic pulse and the second RF periodic pulses are sampled in frequency domain since they are periodic in time domain. The sampled spectral frequency comb is defined as a set of comb teeth spread at a distance equal to the PRF of the corresponding periodic pulse in time domain in waveform 136a. In frequency domain, the corresponding representation of the periodic RF pulse and the baseband frequency pulse of the dual-comb operation is illustrated in waveforms 136b and 138, respectively. The distance between the two comb teeth rises with frequency when comparing the two frequency combs in 136b. This distance should always be less than $$\frac{f_r}{2}$$

in the entire bandwidth (BW) of the RF pulse to have one-to-one mapping of the RF spectrum to baseband spectrum. This is implied by equation:

$$BW \leq \frac{mf_r}{2} = \frac{f_r^2}{2\Delta f_r} \quad (1)$$

where, m stands for compression factor and is equivalent to $$\frac{f_r}{\Delta f_r}.$$

It signifies that the time-domain RF pulse has been increased by m times, or that the RF bandwidth has been reduced by m times. In an example embodiment, the dual-comb transceiver 100b shown in FIG. 1B is designed to operate in the 1 to 3 GHz frequency range. Some embodiments are based on realization that the frequency range of 1 to 3 GHz is a suitable compromise between spatial resolution and the attenuation of microwave signals by an object subjected to microwave imaging (e.g., a human head). Accordingly, the frequency range 1 to 3 GHz is selected to design the dual-comb transceiver 100b. To that end, the frequencies $f_r$ and $f_r+\Delta f_r$ are set to 10 MHz and 1 kHz, respectively. As a result, the compression factor m is 10000, implying that RF frequencies of 1 to 3 GHz are mapped to baseband frequencies of 100 to 300 kHz. In some embodiments, when the dual-comb transceiver 100b is used in the MRI machine to obtain MM of human head, it is required to generate multiple images of the human head. Accordingly, the present disclosure describes a microwave imaging system which comprises the dual-comb transceiver 100b which is configured to provide multiple images of a target object, such as the human head. The detailed description such a microwave imaging system is described further with reference to FIG. 2.

FIG. 2 illustrates a block diagram of a microwave imaging system 200 including the transmitter circuitry 120a and the receiver circuitry 120b of the dual-comb transceiver 100b, according to an embodiment of the present disclosure. FIG. 2 is described below in conjunction with FIG. 1B. The dual-comb transceiver 100b uses a first direct digital synthesizer (DDS) 220 and a second DDS 212 for generating analog waveforms, usually a sine wave, by generating time-varying signals with PRF of $f_r+\Delta f_r$ and $f_r$, respectively. The advantages of DDS devices are low power, low cost, and single small package, combined with their inherent excellent performance and ability to digitally program and reprogram the output waveform.

The TX circuitry 120a is connected to the first DDS 220 and a first amplifier 222. The first DDS 220 generates a sine wave with $f_r+\Delta f_r$ as its frequency. The RX circuitry 120b is connected to the second DDS 212 and a second amplifier 214. The second DDS 212 generates a sine wave with $f_r$ as its frequency. The output frequency $f_{out}$ of a DDS is given by:

$$f_{out}(M) = \frac{f_{clk}}{2^N} \times M = f_{res} * M \quad (1)$$

Where, M stands for binary tuning word, $f_{clk}$ stands for an internal reference clock frequency (system clock) and N stands for a length of the phase accumulator in bits, which may be 32 bits in some examples. For example, if $f_{clk}$=100 MHz and N=32 then $f_{res}$=0.023283-Hz, and $f_{out}$=0.023283× M, where M=1, 2, 3, . . . , $2^{32}$. For each of the two DDS, the DDS 220 and the DDS 212, input is a signal with frequency $f_{clk}$, output is a signal with frequency $f_{out}$. Therefore, for the DDS 220, $f_{out}=f_r+\Delta f_r$ and for the DDS 212, $f_{out}=f_r$. The binary tuning word M is a difference between the frequencies of the DDS 220 and the DDS 212. Thus, by varying M and using equation (1), the frequencies of the DDS 220 and the DDS 212 can be set appropriately, as the corresponding output frequency $f_{out}$. Furthermore, by using variable resolution frequency ($f_{res}$) associated with each of the DDS, frequency combs (comb1 with PRF of $f_r+\Delta f_r$ and comb2 with PRF of $f_r$ are generated. By using DDS, the accuracy between frequency repetition rates $f_r$ and $f_r+\Delta f_r$ is maintained based on equation (1). To that end, $f_{res}$ is a configurable value and may be varied in varied embodiments, as desired by a user, or based on the application in which a dual-comb transceiver based on the DDS provided above is used.

Through a driver 208, the output of the RX circuitry 120b is connected to an ADC 210. The first DDS 220, the second DDS 212 and the ADC 210 in the microwave imaging system 200 receive same clock 224, which is shared by a clock distribution network 218 which is configured to distribute the clock 224 generated by the clock generator 216 to the different components of the microwave imaging system 200 (like the first DDS 220, the second DDS 212 and the ADC 210). By the use of the single clock 224 for the multiple components of the microwave imaging system 200, better synchronization between the different components may be achieved.

Apart from better synchronization between different components within the system, the microwave imaging system 200 also provides synchronization of comb2 signal, which is of frequency $f_r$, among different receiver circuitries. This is achieved by usage of a global distribution architecture illustrated in FIG. 3A.

FIG. 3A illustrates a block diagram of a global distribution architecture 300a of the comb2 signal 312, according to an embodiment of the present disclosure. The global distribution architecture 300a is proposed to maintain the signal synchronization of comb2 signal 312 among a plurality of receiver circuitries. In this architecture, the plurality of receiver circuitries include: a receiver circuit RX1 306, a receiver circuit RX2 308 and a receiver circuit RXN 310. Further, the comb2 signal 312 is provided to a second transmitter circuit (TX2) 304 and to each of the plurality of receiver circuits 306, 308 and 310. To that end, the comb2 signal 312 is generated by using a DDS circuit, such as the DDS circuit 220 and the DDS circuit 212 illustrated in FIG. 2, to generate accurate frequency which is used in global distribution architecture 300a. The comb2 signal 312 is globally distributed to the plurality of receivers like RX1 306, RX2 308 and RXN 310. Therefore all the receivers are synchronized together. Additionally, comb1 signal 302a is given as input to a first transmitter (TX1) circuit 302 and output is taken from a first output port RFOUT 302b.

Further, the comb2 signal 312 is obtained from a second output port RFOUT port 304a of the second transmitter (TX2) circuit 304 and is provided to the plurality of receivers RX1 306, RX2 308, and RXN 310. Each of the plurality of receivers RX1 306, RX2 308 and RXN 310 has six input ports. In each of the plurality of receivers RX1 306 to RXN 310, first port is comb2 signal 312 port, which is configured to receive comb2 signal 312 as input. The other ports is used as ports RFIN0 306a, RFIN1 306b, RFIN2 306c, RFIN3 306d, and RFIN4 306e in the receiver circuit RX1 306; RFIN0 308a, RFIN1 308b, RFIN2 308c, RFIN3 308d, and RFIN4 308e for the receiver circuit RX2 308, and RFIN0 310a, RFIN1 310b, RFIN2 310c, RFIN3 310d, and RFIN4 310e for the receiver circuit RXN 310 are configured to receive RF pulses. Another possible architecture for global distribution of comb2 signal is by using a transceiver circuit, which is illustrated in FIG. 3B.

FIG. 3B illustrates a block diagram showing another global distribution architecture using a dual-comb transceiver, according to an embodiments of the present disclosure.

FIG. 3B is described below in conjunction with FIG. 3A. The global distribution architecture shown in FIG. 3B is based on a dual-comb transceiver system 300b. The dual-comb transceiver system 300b comprises a single chip or an integrated circuit package which includes all the components for implementing the global distribution architecture analogous to the global distribution architecture 300a shown in FIG. 3A on a single chip or package.

The dual-comb transceiver system 300b includes a first path 322, a second path 332 and a third path 334. The first path 322 is for generating the RFOUT pulse 330 for comb1 336a. The second path 332 is used to generate the RFOUT pulse 330 for comb2 signal 336. The third path 334 is for global distribution of comb2 signal 336 to the plurality of receivers. The global distribution of comb2 signal 336 to the plurality of receivers helps to maintain the synchronization between each of them. The first path is travelled by the comb1 signal 336a, and the second path 332 is travelled by comb2 signal 336. The comb2 signal 336 is generated by the DDS 354 which can generate exactly accurate repetition frequency.

In the third path 334, the comb2 signal 336 is given to a plurality of receivers at their corresponding input ports, such as: a first input port RFIN0 338a, a second input port RFIN1 338b, a third input port RFIN2 338c, a fourth input port RFIN3 338d, and a fifth input port RFIN4 338e.

From the corresponding input ports, the global distribution comb2 signal 336 is forwarded as the RF pulse to such as: a first LNA 350a, a second LNA 350b, a third LNA 350c, a fourth LNA 350d and a fifth LNA 350e, respectively. Further, the output of each LNA is given as input to VGA or corresponding RX Baseband module. For example, a first RX Baseband 314a, a second RX Baseband 314b, a third RX Baseband 314c, a fourth RX Baseband 314d, and a fifth RX Baseband 314e through their corresponding mixer modules, which include: a first mixer 340a, a second mixer 340b, a third mixer 340c, a fourth mixer 340d, and a fifth mixer 340e, respectively. The output signal of each RX Baseband is generated by their corresponding ADCs, viz: a first ADC 352a, a second ADC 352b, a third ADC 352c, a fourth ADC 352d, and a fifth ADC 352e, respectively. The output signals from the any of the RX baseband circuits is then used for further processing in applications of microwave imaging. For example, a delay-multiply-and-sum (DMAS) algorithm or machine learning algorithm may be used to generate images for microwave imaging, based on the output of the dual comb transceiver 100b or 300b described above.

Some embodiments are based on the recognition that a selection of an appropriate path for transmission is done based on a selection signal input LO_sel 346 as select line of a first multiplexer (mux) 342 module, which selects either of: the comb2 signal as input (comb2_in) 336, or the signal which is produced from an oscillator OSC 320 as input. The OSC 320 signal is passed through the phase locked loop PLL 316 and a pulse generator PG 326 to the input of the first mux 342. When the selection signal input LO_sel 346 of the first mux 342 is high, then comb2_in 336 is passed as LO signal 344 to each of mixer modules 340a-340e, in the plurality of receiver modules, else OSC signal 320 is passed as LO signal 344 to the plurality of mixer modules 340a-340e. Each mixer uses the same LO signal 344 as comb2_in 336 or OSC signal 322, which is passed through PLL 316 and PG 326.

The first path 322 and the second path 332 is selected using second mux 348. When the select line Comb_sel 324 is low, then first path 322 is selected otherwise second path 332 is selected. If select line Comb_sel 324 of the second mux 348 is high, then the output of the comb2 signal 336 is received through the PLL 316_2, PG 326_2 and PA 328 from an output port RFOUT 330 else comb1 signal's output is received through the PLL 316, PG 326 and PA 328 from the output port RFOUT 330. The second mux 348 receives an input from the OSC 320, which is producing an input signal that has frequency of 40 MHz. The output of the DDS 354 is provided as input 318 to the second mux 348. By using DDS 354, the accuracy in repetition rate between multiple receivers (RX1 306, RX2 308, and RXN 310) and comb2 signal 336 may be achieved.

Thus, the first path 322 incudes signal transmission in the sequence OSC 320->mux 348->PLL 316->PG 326->PA 328 a transmit the signal out from the output port RFOUT 330. Similarly, the second path 332 includes signal transmission in the sequence OSC 320->PLL 316_2->PG 326_2->mux 342->go to all receiving paths. Alternately, the mux 342 may also select the signal from outside by using comb2_in 336+LNA 350f.

FIG. 4A illustrates an integrated circuit diagram of fabricated dual-comb transceiver 400, according to an embodiments of the present disclosure. The dual comb transceiver 400a is analogous to the dual-comb transceiver 100b and accordingly, all the components of dual-comb transceiver 100b are fabricated on a printed circuit board (PCB). From the left side of the PCB, a peripheral component interconnect Express (PCIe) connector is utilized to apply input sine waves with frequencies of $f_r$ and $f_r+\Delta f_r$ and receive the output differential periodic pulse in baseband (BB) with the amplitude of BB+ 130a, and BB− 130b. The operations of the dual-comb transceiver 400 (100b) is already explained above with reference to FIG. 1B.

All the components like DDS, PA 114, VGA 130, SRD, RF switch 116, clock generator 216, clock distributor 218, mixer 126, ADC 210 driver 208, LPF 128 and like are utilized in the fabrication of the dual-comb transceiver 400 which is shown in FIG. 4A. For example, an AD9913 DDS may create sine wave signals with a maximum frequency of 104 MHz and a frequency resolution of 0.058 Hz or greater at speeds up to 250 MSPS. A current parameter of the digital-to-analog converter (DAC) can be used to alter the DDS output voltage level. The AD7760 ADC is a 2.5 MSPS, 24-bit sigma-delta ADC that passes the Nyquist criterion for high-resolution sampling of the 104-300 kHz baseband pulse. Because the output periodic pulse is repeated with PRF $f_r$ of 1 kHz, the output pulse has a period of 2500 ADC samples. The remaining components were chosen to fulfill the bandwidth and link budget constraints.

FIG. 4B illustrates a graph 402 of a transmitter (TX) pulse 402a and a receiver (RX) pulse 402b of the dual-comb transceiver 100b shown in FIG. 1B, according to an embodiment of the present disclosure. In FIG. 4B, X-axis represents the components of the dual-comb transceiver 100b and their corresponding voltage (mVpp) is represented on the Y-axis. All the components of the dual-comb transceiver 110b are used and the channel 204 between TX and RX is attenuated by 40 dB. The graph of TX pulse 402a begins after the pulse-shaping circuit 112, which generates the wideband pulse of frequency 1 to 3 GHz. The graph of RX pulse 402b is dramatically reduced following the LPF, as illustrated by point 402b1.

FIG. 5A illustrates a block diagram 500 of real time microwave image generation implementation in a field-programmable gate array (FPGA) 516, according to an embodiment of the present disclosure. The FPGA 516 includes a MUX 504 and a block memory 510. A first block 526 is used as a select line of the MUX 504. The averaging function is implemented in the FPGA 516 for real time averaging to improve the signal-to-noise ratio (SNR) and shorten the averaging time. One block of data is one period of the output signal, which is 1 millisecond (ms) and equals 2500 ADC samples. The FPGA 516 is set up to add the current block's samples 508 to the incoming block's samples 512. To produce the sum of all incoming ADC data blocks 502, the Read-Modify-Write procedure is used. The first Block select signal 526 is set to 1 when the first data block (ADC data of first one period) arrives, and the ADC data 514 is written to a block memory 510. The first Block is 0 for all future data blocks. The previous ADC data 512 is read from the block memory 510, combined with the incoming data 502, and written to the same position. After all of the blocks have been collected, the averaged data is generated by reading all of the data 514 from the FPGA 516 memory and dividing it by a number of data blocks 518 using a division block 520 of a microcontroller (MCU) 522. The FPGA 516 can also insert or delete one ADC data block to align the data block timing after receiving a predetermined amount of data blocks to counteract data block timing inaccuracy. This function is customizable by MCU 522 to provide for flexibility. An output 524 of the MCU 522 is given to a processing module, such as a CPU for further processing and image generation. For example, a delay-multiply-and-sum (DMAS) algorithm or machine learning algorithm may be used to generate images for microwave imaging, based on the output of the dual comb transceiver 100b or 300b described above.

FIG. 5B illustrates graphical representations 528 of an impact of averaging on quality of a signal 528a, 528b and SNR 528c for diverse types of averaging, according to an embodiment of the present disclosure. FIG. 5B depicts an example of a dual-comb system, averaged 1024 times and windowed at 0.05 ms. In the graph 528a, Y-axis represents the voltage (V), and X-axis represents the time (ms) 528a1. Assess the impact of averaging number on the quality of a dual-comb system output signal in time domain is shown in the graph 528a, the system output is captured with different averaging numbers such as 16, 64, 128, 256, 512, 1024, 2048, and 4096, while each measurement is repeated 10 times and the channel attenuation is set to 40 dB. The FFT of the time-domain signal in graph 528b is shown from 104 KHz to 300 KHz. In the graph 528b, y-axis represents power (dBm) and x-axis represents frequency (KHz) 528b1. In the graph 528c, SNR or signal-to-noise ratio, is defined on y-axis and number of averaging on x-axis 528c1 as a measure of magnitude variations caused by noise in the output signal spectrum in frequency domain. as a result, the SNR for a time-domain signal, such as y, is defined as $$SNR(f) = 20 \times \log_{10} \frac{|Y(f)|}{\sigma(f)}, dB \quad (3)$$

where Y(f) is the FFT of y, j is the absolute value, (Y(f)) is the averaging operation, and σ(f) is the standard deviation of Y(f). The graph 528c depicts the SNR versus the number of averaging points for five different frequencies, 200 KHz 528c2, 150 KHz 528c3, 104 KHz 528c4, 250 KHz 528c5, and 300 kHz 528c6. As shown in FIG. 5B, after 2000 averaging, the SNR remains flat, and increasing the number of averaging does not improve the SNR. and an ADC quantization noise dominates the noise. It should be noted that the highest SNR is obtained at 200 kHz 528c2. The ADC Quantization noise is a quantization error model which is introduced by the quantization of the ADC.

FIG. 6 is a graph that illustrates the measured output pulse of TX 402a according to an embodiment of the present disclosure. In the graph 602, x-axis represents the time in nano second (ns) and y axis represents the voltage (V). In graph 604, x-axis represents the frequency in GHz and y-axis represents the power in dBm. The constructed TX/RX module is used to implement the dual-comb transceiver 100b with one transmitter and one receiver. The response of the dual-comb transceiver 300b in time domain and frequency is depicted in 602 and 604, respectively. The peak-to-peak voltage of the output pulse of the TX 402a is 1.85 Vpp, as shown in graph 602. The FFT of the output pulse of the TX 402a is shown in graph 604. The output pulse of the TX 402a has a maximum power of 33 dBm at 2.40 GHz, as shown in graph 604. The pulse's 10-dB bandwidth is 2.66 GHz, with in the range of 0.36 to 3.02 GHz.

FIG. 7A illustrates graphs 700 comprising responses of the dual-comb transceiver 100b to different attenuations in time domain, according to an embodiment of the present disclosure. In the graphs 700, voltage is representing y-axis and time (ms) is representing x-axis. These graphs show the baseband (BB) output of a dual-comb transceiver in response to various channel attenuations of 20 dB 702a, 30 dB 702b, 40 dB 702c, 50 dB 702d, 60 dB 702e, and 70 dB 702f. The graph of output voltage amplitude is indicating non-linear behavior, according to the time-domain measurement and the output voltage amplitude is equivalent to the noise voltage. The output voltage changes linearly for the 30 dB 702b, 40 dB 702c, 50 dB 702d, and 60 dB 702e channel attenuations.

FIG. 7B illustrates a graph 704 showing the dual-comb transceiver 100b responses to different attenuations in frequency domain, according to an embodiment of the present disclosure. The frequency response of dual-comb transceiver from 104 to 300 kHz is shown on the x-axis. The Power (dBm/10 KHz) of the signal represents on the y-axis. This frequency range is translated to 1 to 3 GHz RF response. The frequency response is calculated by taking FFT from the time-domain measured results of FIG. 7A. The length of the time-domain signal used for taking FFT is 0.1 ms, therefore the frequency resolution is 10 kHz. By limiting the length of the time-domain signal further, the noise is reduced. The signal peak is also aligned to be located in the middle of the period. In this FIG. 704a represents attenuations of 20 dB, 704b represents attenuations of 30 dB, 704c represents attenuations of 40 dB, 704d represents attenuations of 50 dB, 704e represents attenuations of 60 dB, and 704f represents attenuations of 70 dB. When the channel attenuation is 20 dB 704a, the distance between the 20 dB 704a and 30 dB 704b curves is less than 10 dB, which is due to RX saturation and non-linear response. When the channel attenuation is 70 dB 704f, noise affects the signal level above 230 kHz.

FIG. 8 illustrates a flow diagram of microwave imaging using dual-comb transceiver 100b, 300a or 300b, according to an embodiment of the present disclosure. At step 802, the pair of frequency combs (comb1 and comb2) which are different in repetition rate is generated by using DDS. Comb1 signal have repetition rate of $f_r+\Delta f_r$ and comb2 signal have repetition rate of $f_r$. DDS is able to maintain the accuracy of repetition rates between the multiple signals. At step 804, the pair of frequency comb is given as input to the input switch 110 of the dual-comb transceiver 104 and each pair of frequency comb consists of a first frequency comb pulse (comb1) and second comb pulse (comb2). For example, first frequency comb pulse (comb1) has repetition rate of $f_r+\Delta f_r$ 110a and a second frequency comb pulse (comb2) has repetition rate of $f_r$ 110b. Further, at step 806, the output of the input switch 110 is provided to the pulse shaping circuit 112 to generate the short duration pulse. At step 808, the short duration pulse is amplified by using the power amplifier 114 and passed to the RF switch 116 at step 810. The output of RF pulse follows either TX path or the RX path. At step 812, if the RF pulse is passing via RX path, then step 818 is executed otherwise, step 814 is executed. At step 814, the output of the RF switch 116 is transmitting through the coupler 118 to the antenna switch 120 further, at step 816, the antenna switch 120 is passing the RF pulse to the RF port 122. At step 818, the transmitted signal (which is transmitted to the RF port 122, when the RF pulse follows the TX path) is received by the antenna switch 120 from the RF port 122. Further, at step 820, the antenna switch 120 sends the receiving pulse to the LNA 124 which amplifies the RF pulse and sends to the mixer 126. At step 822, the output of the PA 114 is again used as LO signal 116a to the mixer via RF switch 116. Further at step 824, the output of the mixer 126 is passing through the LPF 128 to get only low frequency signal. At step 826, the output of the LPF 128 is provided to the VGA 130 and receives the RF pulse with amplitude of BB+ 130a and BB− 130b. Further at step 828, the output of VGA 130 is sampled. For example, the output of the VGA 130 is passing to the ADC 210 through the drive 208 to get data samples. Further at step 830, output of the ADC is stored in the block memory of the FPGA. For example, the output of the ADC is 210 is stored in the block memory 510 of the FPGA 516 At step 832, data from the block memory of the FPGA is provided to the processing module. For example, data from the block memory 510 of the FPGA 516 is provided to microcontroller 522 and CPU 524. At step 834, by using delay-multiply-and-sum (DMAS) algorithm or with machine learning algorithm, microwave images are generated.

FIG. 9 illustrates another flow diagram of a method 900 for microwave imaging, according to an embodiment of the present disclosure. The method 900 starts at step 901 and proceeds to step 903.

At step 903, at least one comb signal is generated by a DDS circuit. The at least one comb signal has an output frequency of $f_{out}$. For example, referring to FIG. 2, the DDS 220 circuit generates an output signal (corresponding to a frequency comb comb1 or comb) of frequency $f_r+\Delta f_r$ (or $f_r$) Thus, it may be considered that $f_{out}=f_r+\Delta f_r$ (or $f_r$)

Then, at step 905, the generated at least one comb signal is provided as an input to a transmitter circuit. For example, referring to FIG. 3A, the transmitter circuit TX2 304 receives the input signal as comb2 signal. This signal may be generated by a DDS circuit, (such as the DDS circuit 212 or the DDS circuit 220).

Further, at step 907, the at least one comb signal may be transmitted from the at least one transmitter circuit to a plurality of receiver circuits for microwave imaging. For example, referring again to FIG. 3A, the comb2 signal output by the transmitter circuit TX2 304 is provided as input to the plurality of receiver circuits, RX1 306, RX2 308 and RXN 310.

Also, the DDS circuit is configured to generate the output signal based on a clock signal which is provided as an input to the DDS circuit. The output frequency $f_{out}$ of a DDS is given by:

$$f_{out}(M) = \frac{f_{clk}}{2^N} \times M = f_{res} * M \qquad (1)$$

Where, M stands for binary tuning word, $f_{clk}$ stands for an internal reference clock frequency (system clock generated by a clock generator) and N stands for a length of the phase accumulator in bits. For example, if $f_{clk}$=100 MHz and N=32 then $f_{res}$=0.023283-Hz, and $f_{out}$=0.023283× M, where M=1, 2, 3, . . . , $2^{32}$. Furthermore, by using variable resolution frequency ($f_{res}$) associated with the DDS, frequency combs (comb1 with PRF of $f_r+\Delta f$ and comb2 with PRF of $f_r$) are generated. By using DDS, the accuracy between frequency repetition rates $f_r$ and $f_r+\Delta f$ is maintained based on equation (1). To that end, $f_{res}$ is a configurable value and may be varied in varied embodiments, as desired by a user, or based on the application in which a dual-comb transceiver based on the DDS provided above is used.

The generation of the frequency comb signal based on relation given above by the DDS circuit and providing the same comb signal as input to the plurality of receivers in the manner described in various embodiments above, provides the advantages of accurate frequency generation, synchronization between the plurality of receivers, maintenance of high SNR and accurate image generation in microwave imaging applications.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A microwave imaging system, comprising:
   a dual-comb transceiver module, comprising:
   at least one transmitter circuit;
   a plurality of receiver circuits; and
   a direct digital synthesizer (DDS) circuit configured to generate at least one comb signal with an output frequency $f_{out}$,
   wherein the at least one comb signal is provided to the at least one transmitter circuit, and wherein the at least one transmitter circuit is configured to provide the at least one comb signal to the plurality of receiver circuits, and
   a clock generation circuit configured to generate a clock signal with a clock frequency $f_{clk}$, wherein, the output frequency $f_{out}$ of the DDS and the clock frequency $f_{clk}$ follow a relation given by:

$$f_{out}(M) = \frac{f_{clk}}{2^N} \times M = f_{res} * M$$

wherein M comprises a binary tuning word, N comprises a length of a phase accumulator in bits, and $f_{res}$ comprises a frequency of resolution associated with the DDS circuit and is a configurable value.

2. The microwave imaging system of claim 1, wherein the dual-comb transceiver module further comprises a corresponding analog-to-digital converter (ADC) associated with each of the plurality of receiver circuits, wherein the corresponding ADC is configured to generate an output signal for its associated receiver circuit in the plurality of receiver circuits.

3. The microwave imaging system of claim 2, wherein the output signal from the associated receiver circuit is transmitted to a processing module for microwave imaging applications.

4. The microwave imaging system of claim 3, wherein the processing module comprises at least one of a delay-multiply-and-sum (DMAS) algorithm or a machine learning algorithm to generate images for microwave imaging.

5. A method for microwave imaging, comprising:
   generating at least one comb signal by a direct digital synthesizer (DDS) circuit with an output frequency $f_{out}$;
   inputting the generated at least one comb signal to a transmitter circuit;
   transmitting the at least one comb signal from the transmitter circuit to a plurality of receiver circuits for microwave imaging, and
   generating a clock signal with a clock frequency $f_{clk}$, by a clock generation circuit wherein, the output frequency $f_{out}$ of the DDS and the clock frequency $f_{clk}$ follow a relation given by:

$$f_{out}(M) = \frac{f_{clk}}{2^N} \times M = f_{res} * M$$

wherein M comprises a binary tuning word, N comprises a length of a phase accumulator in bits, and $f_{res}$ comprises a frequency of resolution associated with the DDS circuit and is a configurable value.

6. The method of claim 5, further comprising:
   generating an output signal from an associated receiver circuit in the plurality of receiver circuits, wherein the output signal is generated by a corresponding analog-to-digital converter (ADC) associated with the associated receiver circuit.

7. The method of claim 6, further comprising transmitting the output signal from the associated receiver circuit to a processing module for microwave imaging applications.

8. The method of claim 7, wherein the processing module comprises at least one of a delay-multiply-and-sum (DMAS) algorithm or a machine learning algorithm to generate images for microwave imaging.

9. A dual-comb transceiver, comprising:
   at least one transmitter circuit;
   a plurality of receiver circuits;
   a direct digital synthesizer (DDS) circuit configured to generate at least one comb signal with an output frequency $f_{out}$,
   wherein the at least one comb signal is provided to the at least one transmitter circuit, and wherein the at least one transmitter circuit is configured to provide the at least one comb signal to the plurality of receiver circuits, and
   a clock generation circuit configured to generate a clock signal with a clock frequency $f_{clk}$, wherein, the output frequency $f_{out}$ of the DDS and the clock frequency $f_{clk}$ follow a relation given by:

$$f_{out}(M) = \frac{f_{clk}}{2^N} \times M = f_{res} * M$$

Wherein M comprises a binary tuning word, N comprises a length of a phase accumulator in bits, and $f_{res}$ comprises a frequency of resolution associated with the DDS circuit and is a configurable value.

10. The dual-comb transceiver of claim 9, further comprising a corresponding analog-to-digital converter (ADC) associated with each of the plurality of receiver circuits, wherein the corresponding ADC is configured to generate an output signal for its associated receiver circuit in the plurality of receiver circuits.

11. The dual-comb transceiver of claim 10, wherein the output signal from the associated receiver circuit is transmitted to a processing module for microwave imaging applications.

12. The dual-comb transceiver of claim 11, wherein the processing module comprises at least one of a delay-multiply-and-sum (DMAS) algorithm or a machine learning algorithm to generate images for microwave imaging.

* * * * *